Jan. 7, 1930.  W. J. ZAJKOWSKI  1,742,798
SELF FILLING AND DUMPING TRUCK
Filed Jan. 12, 1927   2 Sheets-Sheet 2
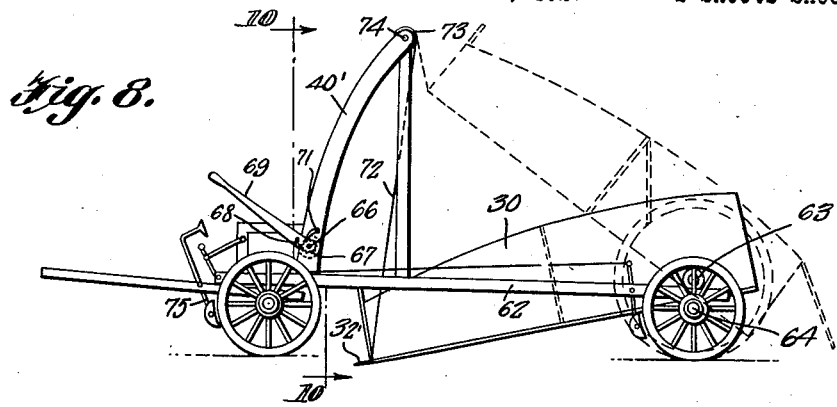
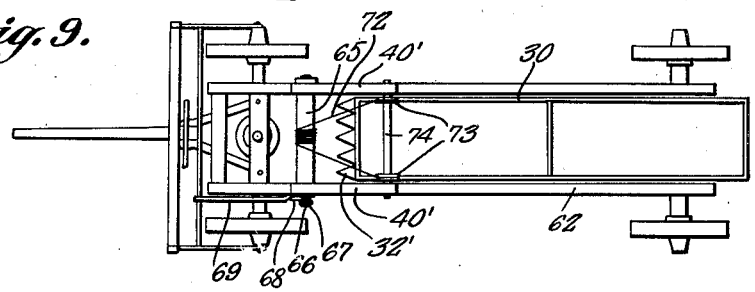
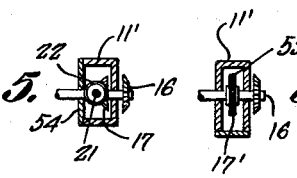
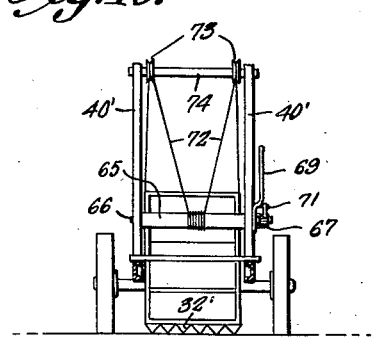
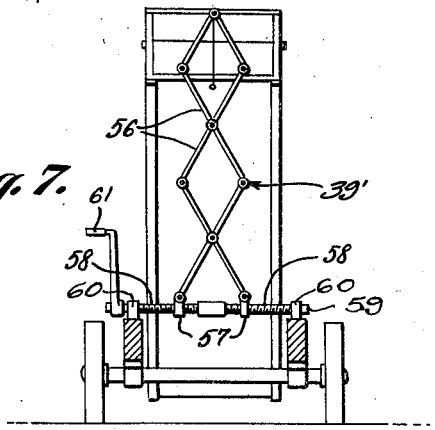
Walter J. Zajkowski
INVENTOR Patented Jan. 7, 1930

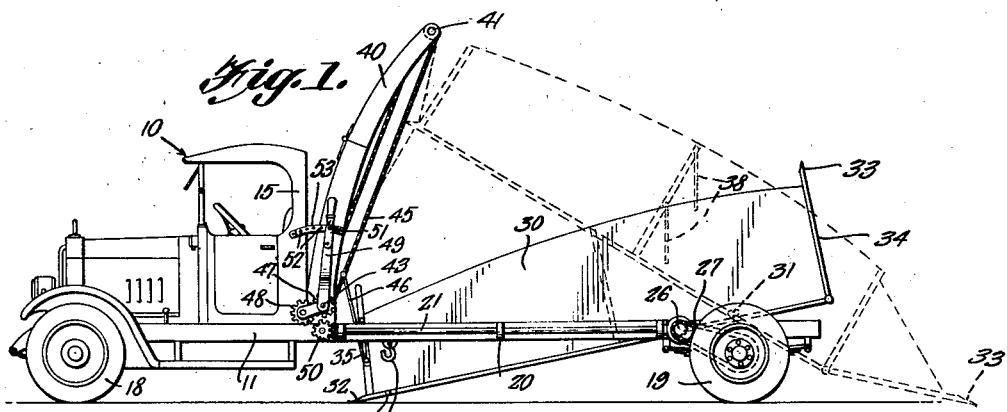
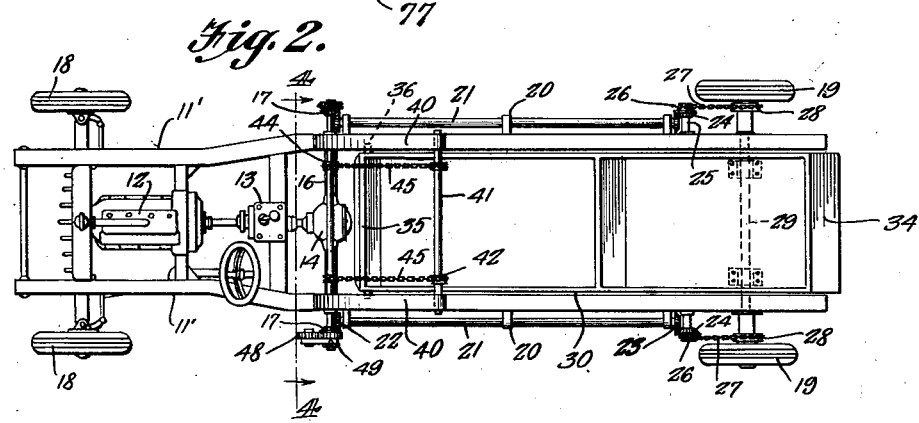
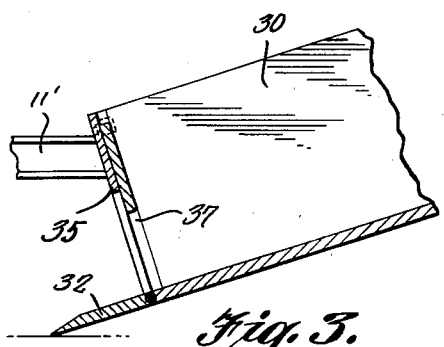
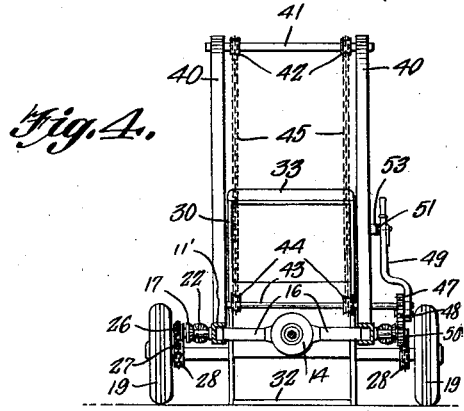
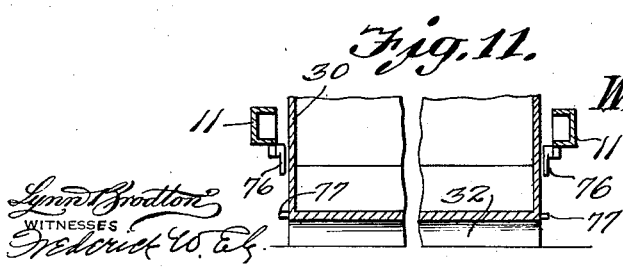

1,742,798

UNITED STATES PATENT OFFICE

WALTER J. ZAJKOWSKI, OF LINOLEUMVILLE, NEW YORK

SELF FILLING AND DUMPING TRUCK

Application filed January 12, 1927. Serial No. 160,752.

This invention relates to improvements in trucks and has particular reference to self filling and dumping trucks.

The primary object of the invention resides in a truck which is adapted to scoop up dirt, gravel, snow or the like which may be deposited in the path of movement of the same, thereby eliminating the expense of labor now employed for manually filling the same.

Another object of the invention is to provide a truck having a pivoted body capable of movement to either a filling position at which time the front end of the body is lowered into engagement with the ground to scoop up material therefrom, or to an intermediate position at which time the level of the body is parallel to the ground for transporting the scooped-up material, or to a position with the front end elevated and the rear end lowered for dumping the contents of the body.

A further object of the invention is the provision of a self filling and dumping body which may be used in connection with either a motor truck or a horse drawn wagon.

A still further object of the invention is to provide a vehicle body adapted to scoop up material from the ground when the front end of the body is lowered into engagement therewith, and which front end is normally closed by a sliding door or gate which is automatically opened as the front end is lowered to allow the scooped material to pass into the body and which door automatically closes upon the rising of the front end to retain the contents within the body.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of my motor truck showing the body in a filling position in full lines, and in a dumping position in dotted lines.

Figure 2 is a top plan view of the truck with the body in a normal position.

Figure 3 is an enlarged vertical sectional view through the front end of the body in the position shown in Figure 1 of the drawing.

Figure 4 is a vertical transverse sectional view on the line 4—4 of Figure 2.

Figures 5 and 6 are detail sectional views of a slightly modified form of driving means.

Figure 7 is a view showing a modified form of hoisting and lowering means.

Figure 8 is a further modification showing the self filling and dumping body applied to a wagon structure.

Figure 9 is a top plan view of the same.

Figure 10 is a vertical transverse sectional view on the line 10—10 of Figure 8.

Figure 11 is a detail sectional view showing the manner in which the body may be held in a carrying position.

Referring more particularly to the drawings, and especially to Figures 1 to 4 inclusive, the reference numeral 10 designates a motor truck including a chassis frame 11 having its side rails 11' disposed parallel to each other and which support the usual motor or engine 12 at the front thereof, the engine shaft of which is connected with the usual transmission 13 and differential 14, but which differential is disposed just behind and below the driver's seat or cab 15. Shafts 16 extend from opposite sides of the differential housing and are journalled in the side rails 11' of the chassis frame. The free end of each shaft 16 carries a beveled gear 17 for a purpose to be presently explained.

The chassis frame 11 is supported upon front wheels 18 and rear wheels 19, which rear wheels are driven in a slightly different manner than now employed on motor vehicles and which will now be described.

Journalled in bearings 20 provided on the outside of the side channel bars 11' are shafts 21 which are disposed parallel to the side rails and which carry beveled gears or pinions 22 and 23 on the respective opposite ends, the pinions 23 co-acting with the beveled gears 24 fixed to stub shafts 25, which shafts also carry sprocket wheels 26. Sprocket chains 27 pass over the sprocket wheels 26 and over larger sprocket wheels 28 fixed to the axle 29 on which the rear wheels are mounted.

From the description thus far it will be understood that the vehicle is driven by the motor 12 through the transmission 13, differential 14, shafts 16, gears 17 and 22, shafts 21, gears 23 and 24, sprockets 26, chains 27 and sprockets 28 to the axle 29. The truck may be driven either in a forward or backward operation by the manual operation of the transmission in the usual manner.

A body 30 is pivotally mounted adjacent the rear of the chassis frame as at 31 and which body comprises front and rear scraper blades 32 and 33 respectively, the rear scraper blade being connected with a tail gate 34 which is normally held up to close the rear of the body, but which gate is lowered for dumping purposes and for scooping up dirt or snow by backing the truck into the same. The front end of the body is normally closed by a gate 35 slidably mounted in the side walls of the body, and which gate has arms 36 extending through slots 37 in the side walls of the body and which are disposed in the path of the side rails 11'. When the body is in a normal horizontal position or in dumping position, the door rests upon the bottom of the body by reason of its own weight, but as the front end of the body is dropped to the full line position shown in Figure 1 of the drawing, the arms 36 strike the side rails 11' which automatically lifts the gate to allow material to be scooped up and passed into the body.

The interior of the body is divided into two separate compartments by swinging doors 38, one pivoted above the other and which co-act to provide a partition when the body is in a horizontal or lowered position. The doors swing backward so that they open automatically as the material is scooped up which forces them to swing open and which doors also swing open when the body is in a dumping position.

For lifting and lowering the front end of the body, I provide a hoisting mechanism 39 which comprises spaced beams 40 which are mounted upon the side rails of the chassis frame and which beams support a shaft 41 at the top thereof and which shaft carries spaced pulley wheels 42. A shaft 43 is journalled in the lower end of the beams and has pulley wheels 44 fixedly mounted thereon. The pulley wheels 42 and 44 receive an endless cable or chain 45 and to one end of which suspension cables 46 are connected, the other ends of the cables 46 being fixedly connected to the truck body. The suspension cables 46 move with the cables 45 to adjustably support the front end of the body.

For imparting movement to the cables 45 in order to adjust the position of the body 30, I provide a gear 47 which is fixedly mounted on one end of the shaft 43 and which is constantly in mesh with an idler gear 48 rotatably mounted upon the lower end of a control lever 49. The gears 47 and 48 are disposed in the same plane as the driven gear 50 carried by one of the shafts 16 whereby rotation may be transmitted from the driven shaft 16 to the shaft 43 to cause movement of the endless cable 45. The idler gear 48 is normally out of co-acting engagement with the gear 40 and is held out by a spring pressed pin 51 carried by the outer end of the lever 49 and which lever is pivotally mounted upon the shaft 43. The pin is received in any one of a plurality of openings 52 provided with a segment 53 mounted on one side of the cab 15 for locking the lever in an operative or inoperative position.

For supporting the body in a horizontal or carrying position, I provide hooks 76 on the sides of the chassis frame for engagement with pins 77 on the sides of the body. The pins clear the chassis frame during the raising of the body for dumping purposes.

In practice, the lever is operated to throw the hoisting mechanism into operation whereby to raise the body 30 to a horizontal position or in the dumping position as shown in dotted lines in Figure 1 of the drawings. Also upon the operation of the lever 49, the front end of the body may be dropped to a scooping position as shown in full lines in Figure 1 of the drawings. When in scooping position, the truck may be driven forward into a pile of dirt or snow, or may be run over the surface on which the material is spread. As the truck moves forward, the blade or scoop 32 drags upon the ground and causes the material to be forced backward into the body where it collects until the same is full. After being filled, the body is raised to a horizontal position and the truck driven to the place where the contents are to be dumped. The hoisting apparatus is again put in operation to lift the body to the position shown in dotted lines in Figure 1 of the drawings, at which time the tail gate 34 is dropped and the contents permitted to slide from the rear end of the body.

In Figure 5 of the drawing, I have shown a slightly modified form of the manner of mounting the drive shafts 21, that is by concealing the same within the channel bars 11' of the chassis frame. The gears 17 and 22 are also concealed by applying a cover plate 54 to the open side of the channel bar.

In Figure 6 of the drawing, a further modified form has been shown. In this form, the channel bar 11' is of inverted U-shape in cross section and in which a sprocket wheel 17' is housed and which is fixed to the shaft 16. A chain 55 passes over the sprocket 17' and leads to a sprocket which may be substituted for the pinion 23 and gear 24 shown in the preferred form.

In Figure 7, I have shown a modified form of hoisting means 39' which comprises a lazy tongs structure 56, one end of which is connected with the body of the truck, while the free ends of the other end of the lazy tongs are connected to two internally screw threaded collars 57 which co-act with oppositely threaded portions 58 provided on a shaft 59 journalled in bearings 60 which are mounted upon the side rails of the chassis frame. A crank handle 61 is carried by one end of the shaft 58 whereby turning movement of the shaft will impart opposite movements to the collars 57. Upon the turning of the crank in one direction, the collars will move toward each other to extend the lazy tongue structure in order to hoist the body of the truck while movement in an opposite direction will cause opposite movement of the collars 56 in order to permit of the lowering of the body.

In Figures 8, 9 and 10, I have shown a further modified form in which a body 30 similar to that shown in the preferred form is pivotally mounted upon a wagon chassis frame 62, which is provided at its rear end with two sets of bearings 63 and 64 which are disposed respectively above and below the chassis frame to allow either a small wheel or large wheel to be applied thereto. In the drawing, a relatively small wheel has been shown as the rear wheels of the vehicle but a larger wheel has been shown in dotted lines and may be used without effecting the level of the chassis with respect to the ground. In this form, a scraper 32' has been shown at the front of the body and which is in the form of a saw edge in order to more thoroughly scoop up the material.

In this form, it is necessary to devise some different construction of hoisting means and for this purpose, I embody a rail or drum 65 which is journalled in a pair of beams 40' which rise from the chassis, and mounted on a shaft 66 on which the drum is mounted is a ratchet 67 engageable by a pawl 68 carried by an actuating lever 69, which lever is freely turnable upon the shaft 66. A dog 71 engages the ratchet and prevents retrograde movement of the shaft and drum. One end of the cables 72 are wound about the drum and pass over pulleys 73 mounted on a shaft 74 which is supported at the top end of the beams 40'. The free ends of the cables are connected to the front end of the body whereby winding of the wheel or drum will cause lifting of the front end of the body while unwinding of the reel will permit of the dropping of the front end to either a horizontal position or to a filling position as shown in full lines in Figure 8.

The wagon structure is provided with a suitable brake mechanism 75 for locking the front and rear wheels when desired to dump the contents of the body.

What is claimed as new is:

1. In combination with the chassis of a vehicle, a body pivoted adjacent one end thereof, a door slidably mounted at the front of said body for vertical movement, hoisting means for lowering, raising, and supporting the front end of said body, and members extending from opposite sides of said door above the sides of said chassis, the sides of said chassis being in the path of downward movement of said members which engage the sides of said chassis upon the lowering of said body into engagement with the ground for effecting the opening of said door.

2. In combination with the chassis of a vehicle having side rails, a body pivoted thereto adjacent one end thereof for swinging movement between said side rails, a scraper blade at the front of said body co-extensive with the bottom wall thereof, means for normally supporting said body on a horizontal plane, lowering and hoisting means for release of said first means, a door slidably mounted at the front end of said body for vertical movement, members extending from opposite sides of said door above the side rails of said chassis, the side rails of said chassis being in the path of downward movement of said members which engage said side rails upon lowering of said body to cause the scraper blade to engage the ground for effecting opening of said door to allow the material scooped up by said scraper blade to pass into said body during forward movement of the vehicle in a forward direction.

3. In a vehicle having a chassis provided with side rails, a tiltable body supported by said chassis, a scraper blade at the front end of said body, a door slidably mounted at the front of said body, and arms extending from said door above said side rails, said side rails being in the path of downward movement of said arms which engage for engagement with said side rails to effect the opening of said door upon the forward tilting of said body to cause the scraper blade to engage the ground, said door dropping to a closed position under its own weight upon the return of said tiltable body to a raised position.

In testimony whereof I have affixed my signature.

WALTER J. ZAJKOWSKI.